(12) United States Patent
Savchenkov et al.

(10) Patent No.: US 11,114,086 B2
(45) Date of Patent: Sep. 7, 2021

(54) TEXT AND AUDIO-BASED REAL-TIME FACE REENACTMENT

(71) Applicant: SNAP INC., Santa Monica, CA (US)

(72) Inventors: Pavel Savchenkov, Sochi (RU); Maxim Lukin, Sochi (RU); Aleksandr Mashrabov, Sochi (RU)

(73) Assignee: Snap Inc., Santa Monica, CA (US)

( * ) Notice: Subject to any disclaimer, the term of this patent is extended or adjusted under 35 U.S.C. 154(b) by 42 days.

(21) Appl. No.: 16/509,370

(22) Filed: Jul. 11, 2019

(65) Prior Publication Data
US 2020/0234690 A1    Jul. 23, 2020

Related U.S. Application Data

(63) Continuation-in-part of application No. 16/251,436, filed on Jan. 18, 2019, now Pat. No. 10,789,453.

(51) Int. Cl.
*G10L 13/00* (2006.01)
*G06K 9/00* (2006.01)
*G10L 13/08* (2013.01)
*G06T 13/40* (2011.01)

(52) U.S. Cl.
CPC .......... *G10L 13/00* (2013.01); *G06K 9/00281* (2013.01); *G06T 13/40* (2013.01); *G10L 13/08* (2013.01)

(58) Field of Classification Search
CPC ... G10L 13/043; G10L 13/08; G06K 9/00281; G06T 13/40
See application file for complete search history.

(56) References Cited

U.S. PATENT DOCUMENTS

2019/0197755 A1*  6/2019  Vats ..................... G06T 13/205

OTHER PUBLICATIONS

Juvela et al: "Speechwaveform Synthesis From MFCC Sequences With Generative Adversarial Networks", 2018. (Year: 2018).*
Olszewski et al: "High-Fidelity Facial and Speech Animation for VR HMDs", 2016. (Year: 2016).*
Carl Vondrick et al: "Generating Videos with Scene Dynamics", Sep. 8, 2016 (Sep. 8, 2016), XP055432559, Retrieved from the Internet: URL: https://arxiv.org/pdf/1609.02612.pdf, the whole document.
(Continued)

*Primary Examiner* — Ruiping Li
(74) *Attorney, Agent, or Firm* — Georgiy L. Khayet

(57) ABSTRACT

Provided are systems and methods for text and audio-based real-time face reenactment. An example method includes receiving an input text and a target image, the target image including a target face; generating, based on the input text, a sequence of sets of acoustic features representing the input text; determining, based on the sequence of sets of acoustic features, a sequence of sets of scenario data indicating modifications of the target face for pronouncing the input text; generating, based on the sequence of sets of scenario data, a sequence of frames, wherein each of the frames includes the target face modified based on at least one of the sets of scenario data; generating, based on the sequence of frames, an output video; and synthesizing, based on the sequence of sets of acoustic features, an audio data and adding the audio data to the output video.

20 Claims, 11 Drawing Sheets

(56) References Cited

OTHER PUBLICATIONS

Konstantinos Vougioukas et al: "End-to-End-Speech-Driven Realistic Facial Animation with Temporal GANs", IEEE Conference on Computer Vision and Pattern Recognition Workshops, Jan. 1, 2019 (Jan. 1, 2019), pp. 37-40, XP055690306, Retrieved from the Internet URL: http://openaccess.thecvf.com/content_CVPRW_2019/papers/Sight%20and%20Sound/Konstantinos_Vougioukas_End-to-End_Speech-Driven_Realistic_Facial_Animation_with_Temporal_GANs_CVPRW_2019_paper.pdf [retrieved on Apr. 29, 2020] the https://openaccess.thecvf.com/content_CVPRW_2019/papers/Sight%20and%20Sound/Konstantinos_Vougioukas_End-to-End_Speech-Driven_Realistic_Facial_Animation_with_Temporal_GANs_CVPRW_2019_paper.pdf.
Phillip Isola et al: "Image-to-Image Translation with Conditional Adversarial Networks", arxiv.org, Cornell University Library, 201 Olin Library Cornell University Ithaca, NY 14853, Nov. 21, 2016 (Nov. 21, 2016), XP080733474, DOI: 10.1109/CVPR.2017.632 the whole document.
Rithesh Kumar et al: "ObamaNet: Photo-realistic lip-sync from text", arxiv. org, Cornell University Library, 201 Olin Library Cornell University Ithaca, NY 14853, Dec. 6, 2017 (Dec. 6, 2017), XP081203368, the whole document.
Supasorn Suwajanakorn et al: "Synthesizing Obama", ACM Transactions on Graphics, ACM, NY, US, vol. 36, No. 4, Jul. 20, 2017 (Jul. 20, 2017), pp. 1-13, XP058372869, ISSN: 0730-0301, DOI: 10.1145/3072959.3073640 the whole document.

\* cited by examiner

TEXT AND AUDIO-BASED REAL-TIME FACE REENACTMENT

CROSS-REFERENCE TO RELATED APPLICATION

This application is a Continuation-in-part of U.S. patent application Ser. No. 16/251,472, entitled "Systems and Methods for Photorealistic Real-Time Portrait Animation," filed on Jan. 18, 2019. The aforementioned application is incorporated herein by reference in their entirety for all purposes.

TECHNICAL FIELD

This disclosure generally relates to digital image processing. More particularly, this disclosure relates to methods and systems for text and audio-based real-time face reenactment.

BACKGROUND

Face reenactment can be used in many applications, such as entertainment shows, social media networks, computer games, video conversations, virtual reality, augmented reality, and the like. Face reenactment can be carried out by animating a single image of a person. Deep learning methods may allow obtaining photorealistic results. However, currently existing deep learning methods are time-consuming and are not suitable to perform a real-time face reenactment on standard mobile devices.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one embodiment of the disclosure, a method for text and audio-based real-time face reenactment is provided. The method may include receiving, by a computing device, an input text and a target image. The target image may include a target face. The method may further include generating, by the computing device and based on the input text, a sequence of sets of acoustic features representing the input text. The method may include generating, by the computing device and based on the sequence of sets of acoustic features, a sequence of sets of scenario data. The sets of scenario data may indicate modifications of the target face for uttering the input text. The method may include generating, by the computing device and based on the sequence of sets of scenario data, a sequence of frames. Each of the frames may include the target face modified based on at least one set of scenario data of the sequence of sets of scenario data. The method may include generating, by the computing device and based on the sequence of frames, an output video.

The method may further include synthesizing, by the computing device and based on the sequence of sets of acoustic features, an audio data representing the input text and adding the audio data to the output video. The acoustic features may include Mel-frequency cepstral coefficients. The sequence of sets of acoustic features can be generated by a neural network.

The generating the sequence of sets of scenario data may include generating, based on the sequence of sets of acoustic features, a sequence of sets of mouth key points and generating, based on the sequence of sets of mouth key points, a sequence of sets of facial key points. The generating the sequence of frames may include determining, based on a sequence of sets of facial key points, a sequence of sets of two-dimensional (2D) deformations and applying each set of 2D deformations of the sequence of the sets of 2D deformations to the target input.

The sequence of sets of mouth key points can be generated by a neural network. A set of the sequence of sets of mouth key points can be generated based on a pre-determined number of sets preceding the set in the sequence of sets of mouth key points. The set of the sequence of sets of mouth key points may correspond to at least one set (S) of the sequence of sets of acoustic features. The set of the sequence of sets of mouth key points can be generated based on a first pre-determined number of sets of acoustic features preceding the S in the sequence of sets of acoustic features and a second pre-determined number of sets of acoustic features succeeding the S in the sequence of sets of acoustic features.

The sequence of sets of facial key points can be generated by a neural network. A set of the sequence of sets of facial key points can be generated based on a pre-determined number of sets preceding the set in the sequence of sets of facial key points.

The method may further include generating, by the computing device and based on the sequence of sets of mouth key points, a sequence of mouth texture images. The method may further include inserting, by the computing device, each of the sequence of mouth texture images in a corresponding frame of the sequence of the frames. Each mouth texture image of the sequence of mouth texture images can be generated by a neural network based on a first pre-determined number of mouth texture images preceding the mouth region image in the sequence of mouth region images.

According to another embodiment, a system for text and audio-based real-time face reenactment is provided. The system may include at least one processor and a memory storing processor-executable codes, wherein the at least one processor can be configured to implement operations of the above-mentioned method for text and audio-based real-time face reenactment upon execution of the processor-executable codes.

According to yet another aspect of the disclosure, there is provided a non-transitory processor-readable medium, which stores processor-readable instructions. When the processor-readable instructions are executed by a processor, they cause the processor to implement the above-mentioned method for text and audio-based real-time face reenactment.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements.

DETAILED DESCRIPTION

Figure 1:
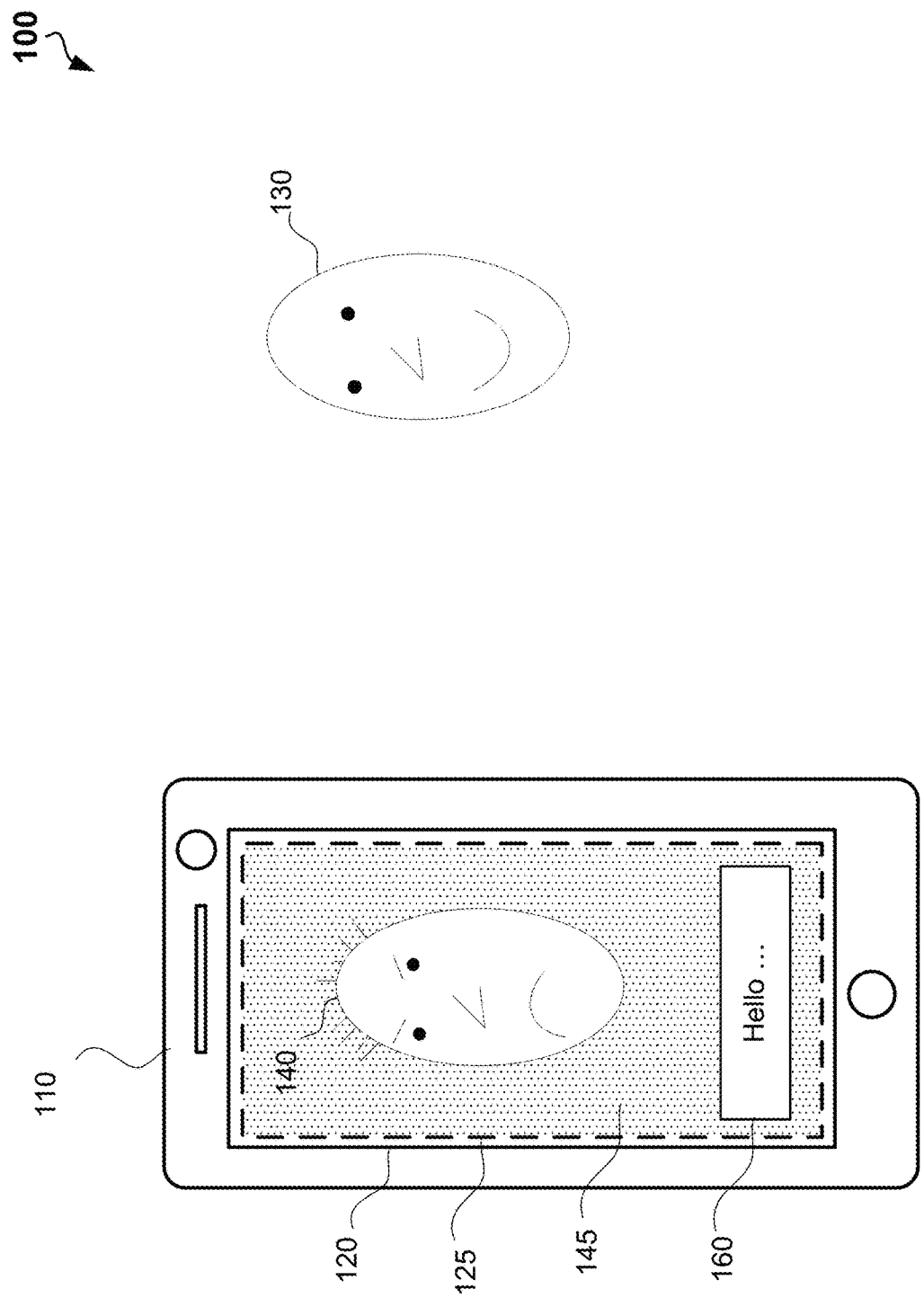
FIG. 1 is a block diagram showing an example environment in which methods for text and audio-based real-time face reenactment can be implemented.

The following detailed description of embodiments includes references to the accompanying drawings, which form a part of the detailed description. Approaches described in this section are not prior art to the claims and are not admitted prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

The present disclosure can be implemented using a variety of technologies. For example, methods described herein can be implemented by software running on a computer system and/or by hardware utilizing either a combination of microprocessors or other specifically designed application-specific integrated circuits (ASICs), programmable logic devices, or any combinations thereof. In particular, the methods described herein can be implemented by a series of computer-executable instructions residing on a non-transitory storage medium such as a disk drive or computer-readable medium. The present disclosure can be designed to work on mobile devices, such as smartphones, tablet computers, or mobile phones, in real-time and without connection to the Internet or the need for use of server-side computational resources, although the embodiments can be extended to approaches involving web service or a cloud-based resources.

This disclosure relates to methods and systems for text and audio-based real-time face reenactment. Some embodiments of the disclosure may allow animation of a face of a person in a target image based on an input text. Embodiments of the disclosure may allow generating a video in which the person's face on the target image becomes "alive" and pronounces the input text. One example embodiment may include a mobile application. The mobile application may allow a user to change an audio in an existing video (for example, a video reel). The mobile application may allow changing visuals and audio of the existing video based on the input text. The user can record or select a new audio for the video or, preferably, enter a new text. The mobile application may synthesize new audio based on the new text and animate a face in the video in accordance with the new audio and new text. Some embodiments may allow transferring an audio style of initial video reel into the synthesized audio.

According to one embodiment of the disclosure, an example method for text and audio-based real-time face reenactment may include receiving, by a computing device, an input text and a target image. The target image may include a target face. The method may include generating, by the computing device and based on the input text, a sequence of sets of acoustic features representing the input text. The method may include generating, by the computing device and based on the sequence of sets of acoustic features, a sequence of sets of scenario data. The sets of scenario data may indicate modifications of the target face for pronouncing the input text. The method may include generating, by the computing device and based on the sequence of sets of scenario data, a sequence of frames. Each of the frames includes the target face modified based on at least one set of scenario data of the sequence of sets of scenario data. The method may include generating, by the computing device and based on the sequence of frames, an output video. The method may further include synthesizing, by the computing device and based on the sequence of sets of acoustic features, an audio data representing the input text. The method may include adding, by the computing device, the audio data to the output video.

Referring now to the drawings, exemplary embodiments are described. The drawings are schematic illustrations of idealized example embodiments. Thus, the example embodiments discussed herein should not be understood as limited to the particular illustrations presented herein, rather these example embodiments can include deviations and differ from the illustrations presented herein as shall be evident to those skilled in the art.

FIG. 1 shows an example environment 100, wherein a method for text and audio-based real-time face reenactment can be practiced. The environment 100 may include a computing device 110 and a user 130. The computing device 110 may include a graphical display system 120. The computing device 110 can refer to a mobile device such as a mobile phone, smartphone, or tablet computer. In further embodiments, however, the computing device 110 can refer to a personal computer, laptop computer, netbook, set top box, television device, multimedia device, personal digital assistant, game console, entertainment system, infotainment system, vehicle computer, or any other computing device.

In some embodiments of the disclosure, the computing device 110 can be configured to display a target image 125. The target image 125 may include at least a target face 140 and a background 145. The target face 140 may belong to the user 130 or a person other than the user 130. In some embodiments, the target image 125 can be stored in a memory storage of the computing device 110 or in a cloud-based computing resource to which the computing device 110 is communicatively connected.

In yet other embodiments, the target image 125 can be pre-recorded and stored in the memory of the computing device 110 or in the cloud-based computing resource. A user 130 may select the target image to be animated.

In some embodiments, the computing device 110 can be configured to receive an input text 160. The computing device 110 can be configured to analyze the input text to generate a sequence of sets of scenario data indicating modifications of the target face for pronouncing the input text 160. The computing device 110 can be further configured to modify the target image 125 based on the scenario data to generate a sequence of frames. Each frame for the sequence of frames may include the target face modified based on one of the sets of scenario data. The computing device 110 may further generate a video based on the sequence of frames. The computing device 110 may further synthesize an audio data based on the input text and add the audio data to the video. The computing device 110 may play the video via the graphical display system 120. The video may feature a person with the target face, wherein the person pronounces the input text.

Figure 2:
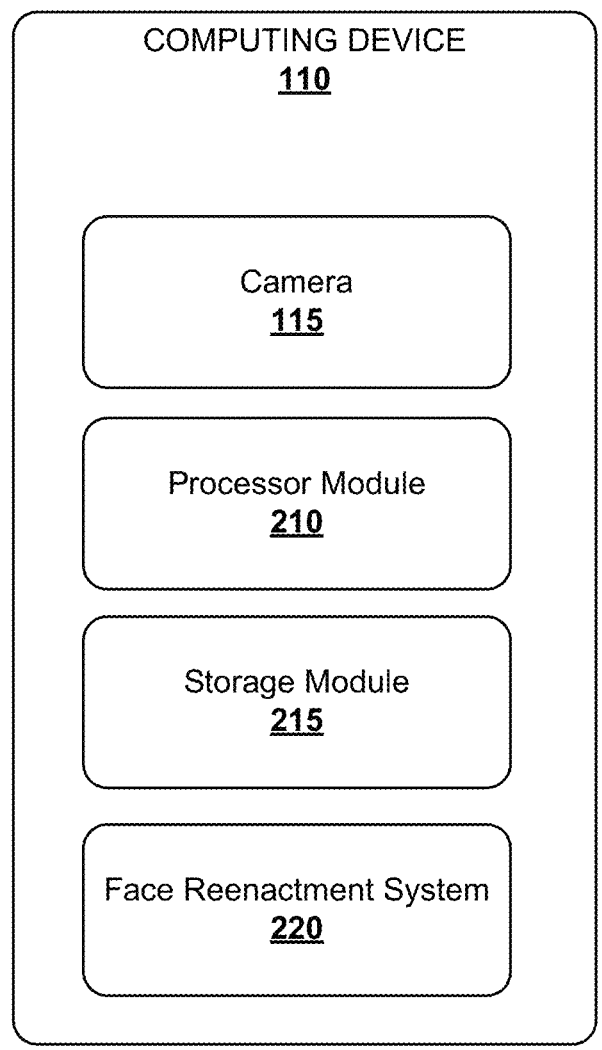
FIG. 2 is a block diagram showing an example embodiment of a computing device for implementing methods for text and audio-based real-time face reenactment.

In the example shown in FIG. 2, the computing device 110 may include both hardware components and software components. Particularly, the computing device 110 may include a camera 115 or any other image-capturing device or scanner to acquire digital images. The computing device 110 can further include a processor module 210 and a storage module 215 for storing software components and processor-readable (machine-readable) instructions or codes, which when performed by the processor module 210 cause the computing device 200 to perform at least some steps of methods for text and audio-based real-time face reenactment as described herein.

The computing device 110 can further include a face reenactment system 220, which, in turn, can include hardware components (e.g., a separate processing module and memory), software components, or a combination thereof.

Figure 3:
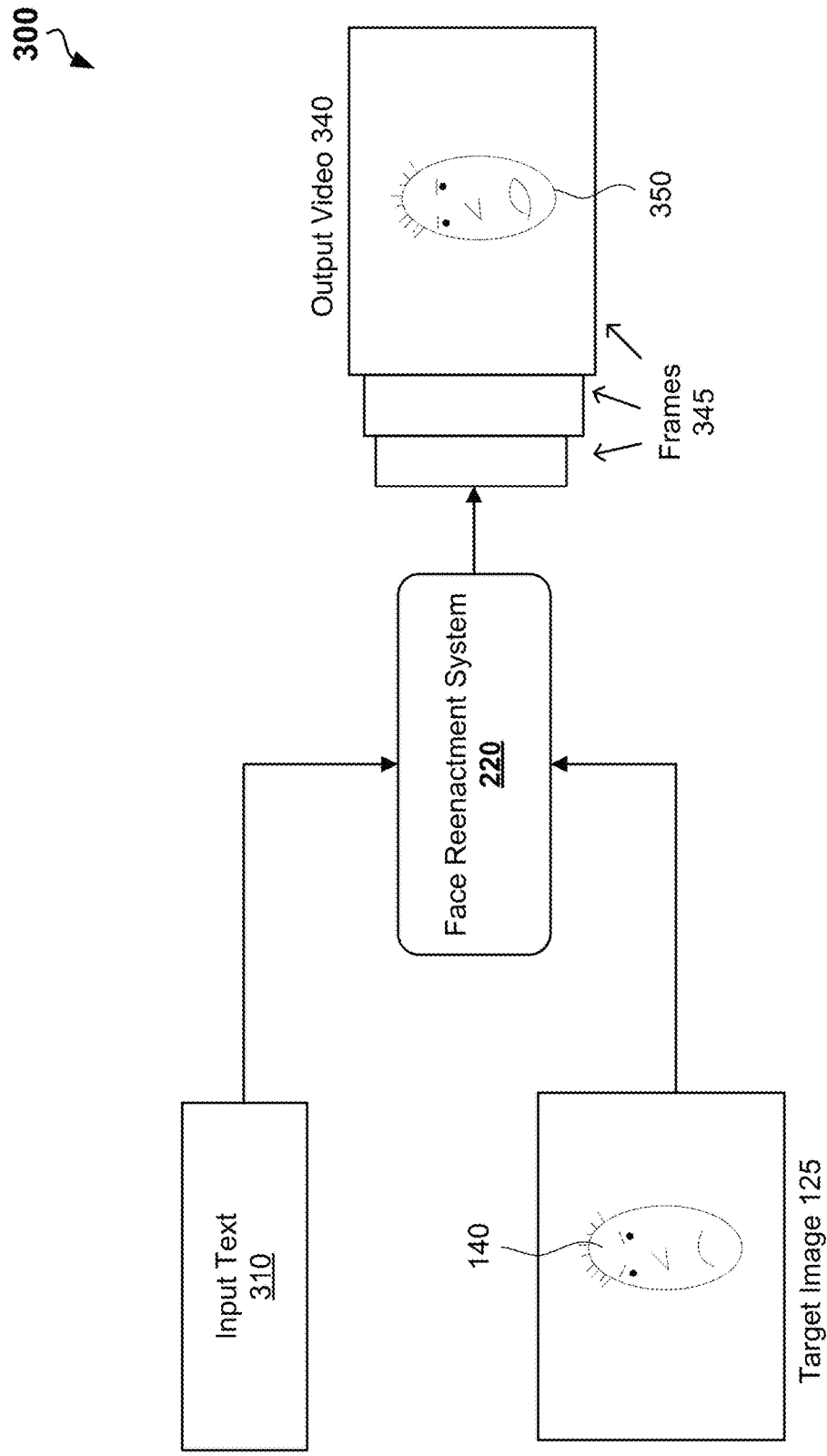
FIG. 3 is a schematic showing an example process of text and audio-based real-time face reenactment, according to an example embodiment.

As shown in FIG. 3, the face reenactment system 220 can be configured to receive, as an input, a target image 125 and an input text 310. The target image 125 may include a target face 140. The face reenactment system 220 can be configured to analyze the text input to determine a sequence of sets of acoustic features representing the input text. Each of the sets of acoustic features may correspond to a timestamp which can be assigned to one of the frames 345 of output video 340.

Based on the sequence of sets of acoustic features, the face reenactment system 220 may generate a sequence of sets of scenario data. Each set of the scenario data may indicate modifications of the target face 350 in at least one of the frames 345. Each of the sets of scenario data may include a set of mouth key points, a mouth texture image, and a set of facial key points. The mouth key points may represent facial landmarks located substantially around a mouth region of a model face. The facial key points may represent facial landmarks located at least around face shape, in regions of nose, eyes, and brows of the model face.

Thus, each of the sets of the scenario data may represent a facial expression and head movement of the model face.

Figure 4:
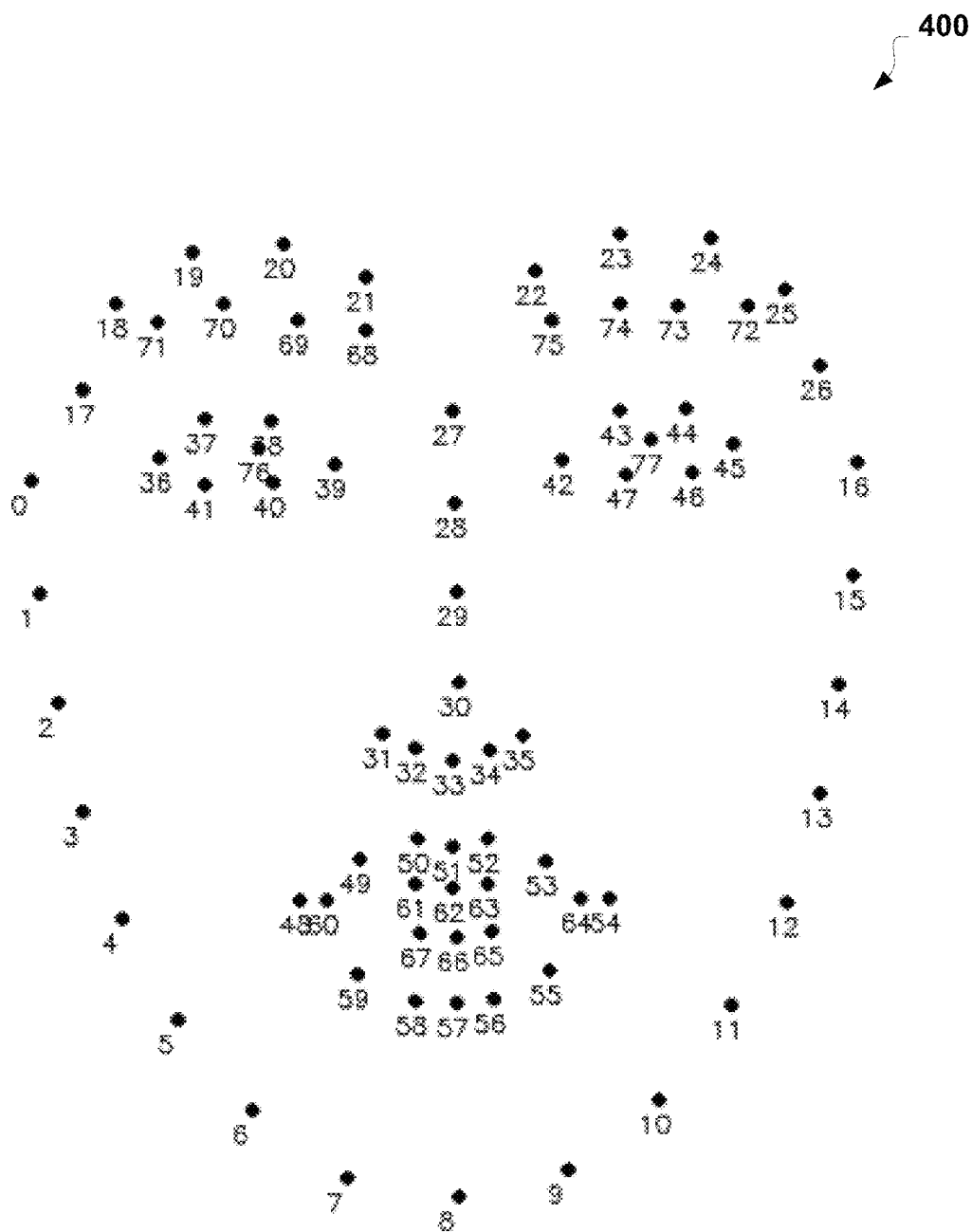
FIG. 4 shows an example set of facial key points, in accordance with some example embodiments.

FIG. 4 shows mouth key points and facial key points of a model face 400, according to an example embodiment. In example FIG. 4, a set of mouth key points includes 20 key points enumerated from 48 to 67. The mouth key points 48-67 are located substantially around a mouth region of the model face 400. In some embodiments, the facial key points may include the 20 mouth key points and additional facial landmarks around face shape, in regions of nose, eyes, and brows. In example of FIG. 4, the number of facial key points is 78. The facial key points are enumerated from 0 to 77. The facial key points and mouth key points can be represented as points in a 2D space. The facial key points and mouth key points may correspond to particular facial landmarks (for example, a corner of a brow, a corner of an eye, a corner of mouth, a bottom of a chin, and so forth).

Referring back to FIG. 3, the face reenactment system 220 may further transfer the facial expression and head movement of the model face to the target image 125. The output video 340 may include the same number of frames as the number of sets in the sequence of sets of scenario data. As result, the output video 340 may represent an animation of the target image 125. In some embodiments, the animation can be carried out by performing 2D deformations of the target image 125, wherein the 2D deformations imitate the facial expression and the head movements of the model face. In some embodiments, the 2D deformations can be followed by generation of hidden regions and fine-scale details to achieve photorealistic results. The hidden regions may include a mouth region of the target face 140.

The face reenactment system 220 may further generate, based on the sequence of sets of acoustic features, an audio data representing the input text and add the audio data to the output video 340.

Figure 5:
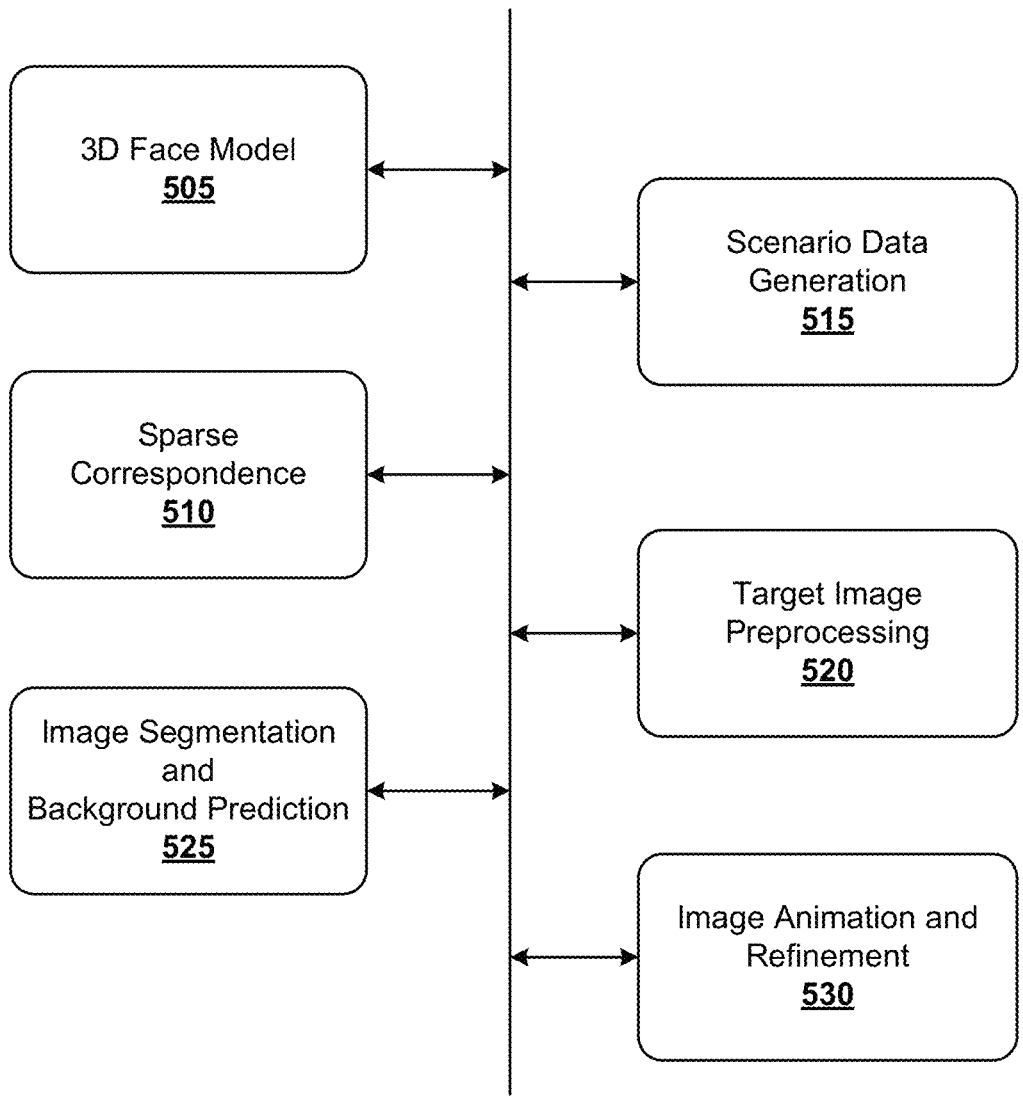
FIG. 5 shows a block diagram of a system for text and audio-based real-time face reenactment, in accordance with an example embodiment.

FIG. 5 is a block diagram of a face reenactment system 220, according to one example embodiment. The face reenactment system 220 can include a three-dimensional (3D) face model 505, a sparse correspondence module 510, a scenario data generation module 515, a target image pre-processing module 520, image segmentation and background prediction module 525, and an image animation and refinement module 530. The modules 505-530 can be implemented as software components for use with hardware devices such as computing device 110, a server, and the like.

In some embodiments of the disclosure, the 3D face model 505 can be pre-generated based on images of a pre-defined number of individuals of different ages, genders, and ethnic backgrounds. For each of the individuals, the images may include an image of the individual having a neutral facial expression and one or more images of the individual having different facial expressions. The facial expression may include mouth-open, smiling, angry, astonished, and so forth.

The 3D face model 505 may include a template mesh with a pre-determined number of vertices. The template mesh may be represented as 3D triangulation defining a shape of a head. Each of the individuals can be associated with an individual-specific blend shape. The individual-specific blend shape can be adjusted to the template mesh. The individual-specific blend shape may correspond to specific coordinates of vertices in the template mesh. Thus, different images of individuals may correspond to the template mesh of the same structure. However, coordinates of vertices in the template mesh are different for the different images.

In some embodiments of the disclosure, the 3D face model 505 may include a bilinear face model depending on two parameters: facial identity and facial expression. The bilinear face model can be built based on blend shapes corresponding to the images of individuals. Thus, the 3D face model includes the template mesh of a pre-determined structure, wherein the coordinates of vertices depend on facial identity and facial expression. The facial identity may represent a geometrical shape of a head.

In some embodiments of the disclosure, the scenario data generation module 515 can be configured to generate, based on an input text, a sequence of sets of scenario data and an audio data. Each set of the scenario data may include a set of facial key points which represent 2D facial landmarks of a model face. The scenario data generation module 515 can be configured to fit the 3D face model 505 to the 2D facial landmarks to find parameters of 3D face model 505 for the model face. The scenario data generation module 515 can be configured to determine location of the 2D facial landmarks on the template mesh of the 3D face model. It can be assumed that the facial identity is the same for all frames of the scenario video. The module 515 can be further configured to approximate the resulting changes of 3D face parameters for each set of the sequence of the scenario data. The scenario data generation module 515 can be also configured to generate, based on an input text, a sequence of mouth texture images. Further details of the scenario data generation module 515 are described further with connection to FIG. 6.

In some embodiments, the sparse correspondence module 510 can be configured to determine a sparse correspondence between facial key points of each set in the sequence of sets of scenario data and facial key points of the target image 125. The sparse correspondence module 510 can be configured to obtain a set of control points (facial landmarks), which can be robustly tracked through the scenario video. Facial landmarks and additional control points can be tracked using state-of-the-art tracking methods, such as optical flow. The sparse correspondence module 510 can be configured to determine an affine transformation that approximately aligns the facial key points in the first set of the sequence of sets of scenario data and facial key points in the target image 125. The affine transformation can be further used to predict the location of additional control points in the target image 125. The sparse correspondence module 410 can be further configured to build a triangulation of the control points.

In some embodiments, the target image preprocessing module 520 may be configured to detect 2D facial landmarks and visible parts of the head in the target image 125 and fit the 3D facial model to the 2D facial landmarks and visible parts of the head in the target image 125 and target face 140. The target face 140 may not have a neutral facial expression, or have eyes closed or mouth open, and a person depicted on the target image may be of a different age than the person depicted in the scenario video. The module 530 can be configured to normalize the target face (for example, rotate the head to a neutral state, close the mouth or open the eyes of the target face). Facial landmark detection and 3D face model fitting can be carried out using an iterative process. In some embodiments, the iterative process can be optimized for central processing unit (CPU) and graphics processing unit (GPU) of a mobile device which may allow to significantly decrease the time needed for pre-processing of the target image 125.

In some embodiments, the target image preprocessing module 520 can be further configured to apply beauty effects and/or change the appearance of person depicted on the target image 125 (for example, change the hair color or hairstyle of the person or make the person look older or younger).

In some embodiments, the image segmentation and background prediction module 525 can be configured to perform segmentation of a head of a person from an image of the person. The segmentation of the head can be performed for the target image to obtain an image of the head and/or the target face 140. Animation can be further carried out on the image of the head or the target face 140. The animated head and/or target face 140 can be further inserted back into the background 145. Animating only the image of the head and/or face target 140 by applying 2D deformation may help to avoid unnecessary changes in background 145 which may be caused by the 2D deformations. Since the animation may include changes in head pose, some parts of a background which are previously invisible may become visible leading to gaps in the resulting image. To fill the gaps, the part of the background which is covered by the head can be predicted. In some embodiments, a deep learning model can be trained to perform the segmentation of a person's head from an image. Similarly, deep learning techniques can be used for predictions of background.

In some embodiments, the image animation and refinement module 530 can be configured to animate a target image frame by frame. For each set of facial key points in the sequence of sets of the scenario data, changes in positions of the control points can be determined. The changes in position of control points can be projected onto the target image 125. The module 530 can be further configured to build a warp field. The warp field can include a set of piecewise linear transformations induced by changes of each triangle in triangulation of the control points. The module 530 can be further configured to apply the warp field to the target image 125 and by doing so produce a frame of output video 340. Application of the warp field to an image can be performed relatively fast, which may allow the animation to be performed in real time.

In some embodiments, the image animation and refinement module 530 can be further configured to generate hidden regions (for example, the inner mouth region). Several approaches can be used to generate the hidden region. One approach may include inserting the mouth texture images generated by the scenario data generation module 515 based on the input text. The mouth texture images can be inserted to the mouth interior of a person in the target image. Another approach may include generating hidden regions with the use of a 3D mouth model. The 3D mouth model can match the geometry of the 3D face model.

In some embodiments, the module 530 can be configured to generate partly occluded regions (like mouth, iris, or eyelids) and fine-scale details. Generative adversarial networks could be used to synthesize realistic textures and realistic eye images. The module 530 may be further configured to replace eyes in the hidden regions of the target image with the realistic eye images generated using the generative adversarial networks. The module 530 can be configured to generate the photorealistic textures and fine-scale details for the target image based on the target image and original and current parameters of a 3D face model. The module 530 may further refine the target image by replacing hidden regions with generated photorealistic textures and applying the fine-scale details to the whole target image. Applying the fine-scale details may include applying shadow masks to each frame of the target image.

In some embodiments, the module 530 can be further configured to apply other effects (for example, color correction and light correction) on target images that are required to make the animation look realistic.

Figure 6:
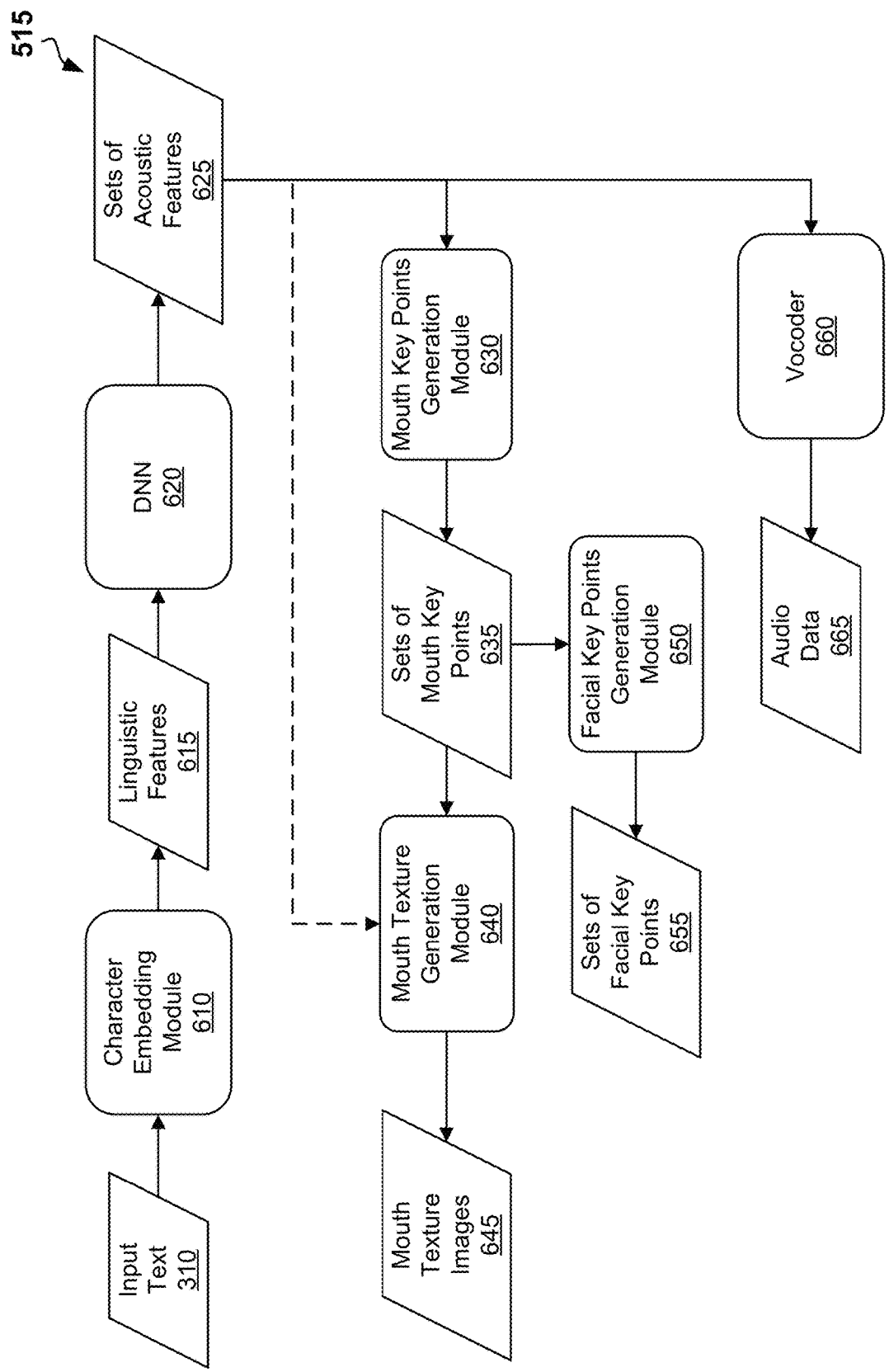
FIG. 6 shows a block diagram of a scenario data generation module, in accordance with an example embodiment.

FIG. 6 is a block diagram showing an example scenario data generation module 515, according to one example embodiment. The scenario data generation module 515 may include a character embedding module 610, a deep neural network (DNN) 620, a mouth key points generation module 630, a mouth texture generation module 640, a facial key points generation module 650, and a vocoder 660.

In some embodiments, the character embedding module 610 may generate, based on an input text 310, linguistic features 615. The module 610 may pre-process the input text 310. The pre-processing may include replacing abbreviations in the input text with words, converting the input text to lower case, removing unnecessary whitespaces, converting numbers to words, and so forth. The module 610 may further convert the words to phonemes using a pronouncing dictionary. The module 610 may further convert the phonemes to a sequence of linguistic features 615. The linguistic features 615 can be represented as padded sequences of one-hot vectors.

In some embodiments, the DNN 620 may convert the sequence of linguistic numerical features to a sequence of sets of acoustic (numerical) features 625. Each of the sets of acoustic (numerical) features 625 may be assigned a timestamp. Each of the sets of acoustic features may correspond to one of frames 345 in output video 340. In some embodiments, the output video 340 can be generated at a rate of an N frames per second (for example, 30 frames per second). Thus, the number of sets in the sequence of the sets of acoustic features can be determined based on a desired frame rate of the output video. Additionally, the number of sets can be also determined based on the desired duration of an audio representing the input text.

The acoustic features may be presented as a Mel-frequency cepstrum or a set of speech parameters including fundamental frequency (F0), a spectral envelope (SP), and aperiodicity (AP). Generation of acoustic numerical features can be conditioned based on speaker identification data or speaker attributes. The speaker attributes may include "male," female," "child," "accent," and so forth. In these embodiments, DNN 620 may be configured to receive, as an input, an additional one-hot encoded vector representing speaker identification data or speaker attributes. In further embodiments, DNN 620 may receive an audio sample. The DNN 620 may include finetuning an embedding layer to transfer a style of the audio sample to the acoustic features. In some embodiments, DNN 620 can be configured to synthesize singing. For singing synthesis, DNN 620 can be conditioned on continuous pitch parameter and linguistic features as control input.

In some embodiments, the vocoder 660 may apply a deterministic algorithm that decode set of speech parameters (a fundamental frequency (F0), a spectral envelope (SP), and aperiodicity (AP)) to produce an audio data (for example, a speech waveform as output). In other embodiments, the vocoder 660 may include a neural vocoder based on a neural network. The neural vocoder may decode a Mel-frequency cepstrum and produce the speech waveform.

In some embodiments, the mouth key points generation module 630 may generate, based on the sequence of the sets of acoustic features, a sequence of sets of mouth key points 635. Each of the sets of mouth key points can correspond to one of frames 345 of output video 340 (shown in FIG. 3) and be assigned a timestamp of the corresponding frame. The sets of mouth key points 635 can be generated sequentially by a neural network based on sets of acoustic features 625. The mouth key points can be represented by a list of x-coordinates and y-coordinates for each frame.

At each step, the neural network can use, as an input, a pre-determined number of sets of mouth key points generated for previous frames by the same neural network. To obtain a temporal coherence, the neural network can also use, as an input, sets of acoustic features corresponding to a fixed-length time window. The time window may cover a pre-determined time before a current timestamp and a pre-determined time after the current timestamp. The acoustic features can be presented in the form of Mel Frequency Cepstral Coefficients. The neural network may apply convolutions to the acoustic features and the key points to extract latent features and then to concatenate the latent features. The neural network may further apply one or more fully connected layers to concatenated latent features to obtain final prediction for the key points at current timestamp. The neural network can be trained on a set of videos recorded in a controlled environment and featuring one or more actors speaking different predefined sentences.

During the training the neural network, the mouth key points of training sets can be normalized on each frame independently using affine transformation. The normalization may include determining coordinates of the mouth key points in a Cartesian coordinate system. Affine transformation is applied to the mouth key points in such a way that points corresponding to mouth corners (the key points numbers 48 and 54 in FIG. 4) are moved to points ($\frac{1}{3}$ $\frac{1}{2}$) and ($\frac{2}{3}$, $\frac{1}{2}$), respectively. The affine transformation may include combination of rotation, translation and scaling.

In some embodiments, during the training the neural network, a principal component analysis (PCA) can be further performed on the mouth key points of the training sets. In these embodiments, the neural network can be trained to predict PCA coefficients instead of raw coordinates of the mouth key points. Configuring the neural network to predict PCA coefficients may allow to decorrelate the input features, decorrelate output values, and reduce sizes of input and output of the neural network. The output of the neural network in the form of the PCA coefficients can be more interpretable than the output in the form of raw coordinates.

In some embodiments, the mouth texture generation module 640 can be configured to generate a sequence of mouth texture images 645. Each of the mouth texture images 645 can correspond to one frame 345 of output video 340. The sequence of the mouth texture images can be generated by a convolutional neural network (CNN) based on the sequence of the sets of mouth key points 635 and, optionally, the sequence of the sets of acoustic features 625. The CNN may sequentially generate each of the mouth texture images based on a pre-determined number of previously generated mouth texture images. The CNN may also use, as an input, a pre-determined number of masks generated based on the sequence of mouth key points from a time window around a current timestamp. The current timestamp corresponds to the frame for which the mouth texture image is generated.

Figure 7:
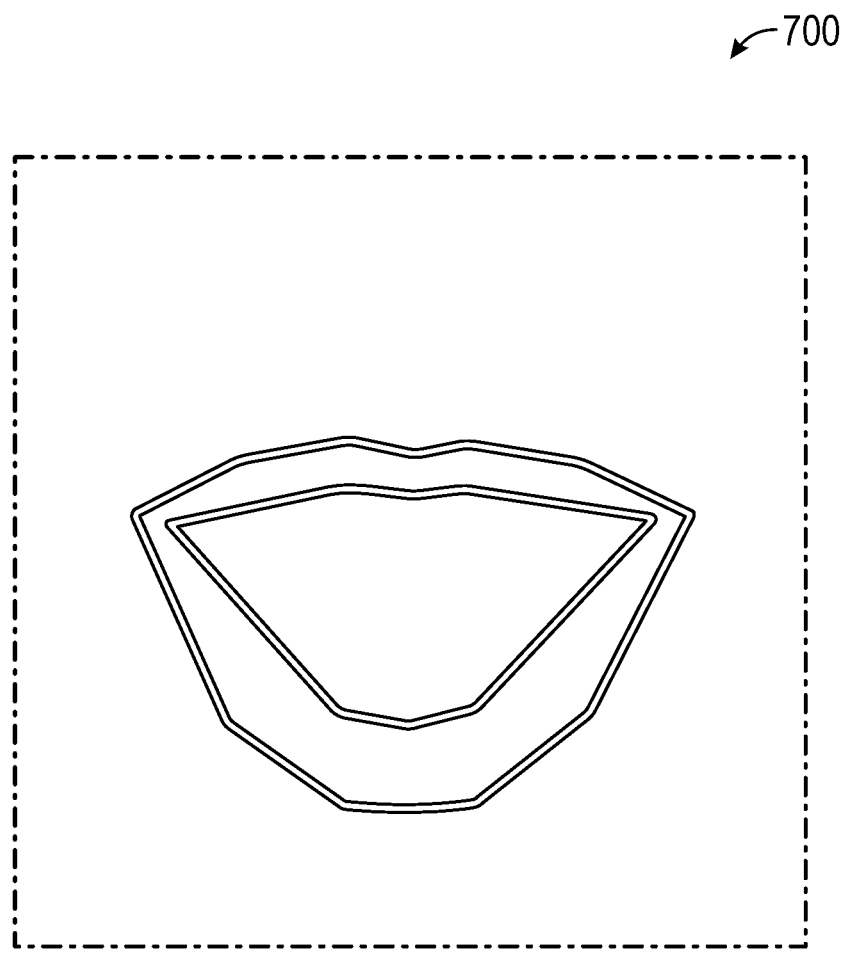
FIG. 7 shows an example mouth key points mask, in accordance with some example embodiments.

FIG. 7 shows an example mask 700 generated for a set of mouth key points, according to an example embodiment. The mask may include lines connecting internal mouth key points and lines connecting external mouth key points.

Figure 8:
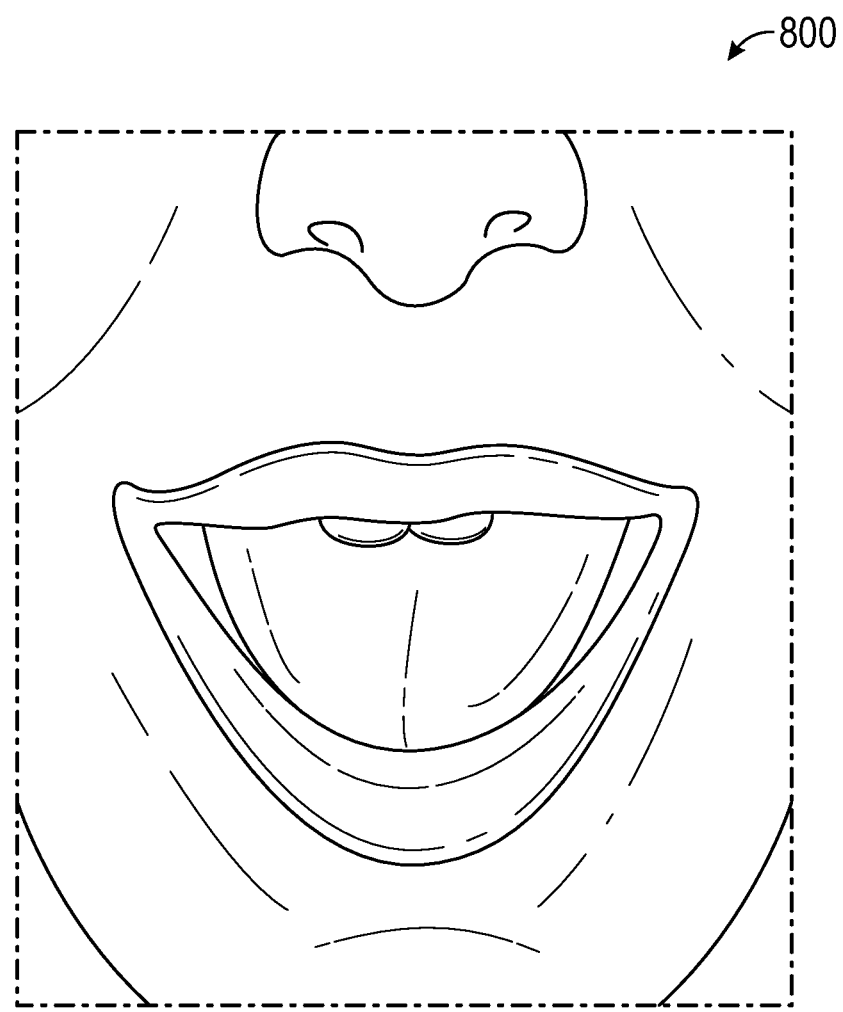
FIG. 8 shows a frame with a mouth texture image, in accordance with an example embodiment.

FIG. 8 shows an example mouth texture image 800.

Referring back to the FIG. 6, the CNN used in the mouth texture generation module 640 can be trained on a training set generated based on real videos recorded in a controlled environment with a single actor speaking different predefined sentences. The single actor can be the same in all the videos.

To achieve time-consistency, the training neutral network may include the following iterations:

1) Constructing an input based on previous ground-truth images for i-th image prediction. The ground truth images can be extracted from the real videos.

2) Predicting i-th image and performing a gradient backward pass.

3) Constructing an input for (i+1)-th image prediction using the predicted i-th image instead of ground-truth i-th image.

4) Predicting (i+1)-th image and performing gradient backward pass.

5) Constructing an input for (i+2)-th image prediction using the predicted i-th image and the predicted (i+1)-th image instead of a ground-truth i-th image and ground-truth (i+1)-th images.

6) Predicting (i+2)-th image and performing gradient backward pass.

A fixed number of the iterations can be performed to obtain consistency between consecutive images in the sequence of the mouth texture images.

To achieve photo-realism of the mouth texture images, a "discriminator" neural network, such as Generative Adversarial Network (GAN), can be used with the CNN ("generator") to generate the mouth texture images. The discriminator is used to classify images between real images (ground-truth images taken from real videos) and fake images (images generated by a generator). At each iteration of the training, the generator may "fool" the discriminator to maximize a probability of the generated image being "real" according to the discriminator.

Additionally, a multiscale U-net-like architecture for GAN, a feature matching loss (in discriminator), and a perceptual loss can be used to improve photo-realism and resolution of generated mouth texture images. A basic GAN loss function can be replaced by a more advanced GAN loss function (for example, a loss function from Least-Square GAN (LSGAN)). The LSGAN loss function can be described by formulas:

$$G_{loss} = \frac{1}{2} E[(D(G(c),c)-1)^2]$$

$$D_{loss} = \frac{1}{2} E[(D(x, c)-1)^2] + \frac{1}{2} E[(D(G(c), c))^2]$$

wherein $G_{loss}$ is a generator loss and $D_{loss}$ is a discriminator loss, x is a generated image, and c are facial landmarks of an image on which the generated image is conditioned.

During training the CNN, mouth key points, corresponding mouth images, and key points mask images can be normalized as described above with connection to the mouth key points generation module 630.

In some embodiments, the facial key points generation module 650 may generate, based on the sequence of sets of mouth key points 635, a sequence of sets of facial key points 655. An example set of facial key points and an example set of mouth key points were described above in connection with FIG. 4. The sequence of sets of facial key points 655 can be generated by a neural network. The neural network can sequentially generate each of the sets of face key points for each frame based on a fixed number of sets of face key points previously generated by the same neural network. For generation of each of the sets of face key points, the neural network may also receive, as an input, a pre-determined number of sets of mouth key points generated for frames of a fixed-length time window before current timestamp.

The neural network for generating the sets of facial key points can be trained on a set of real videos recorded in a controlled environment and featuring a single actor speaking different predefined sentences. The single actor can be the same in all the videos.

During the training, the mouth key points can be normalized as described above with connection of the mouth key points generation module 630. Face key points can be normalized with an affine transformation determined only on the first frame of the video. The affine transformation can then be applied to each next frame of the video. The normalization includes determine coordinates of a pre-determined number of facial key points in a Cartesian coordinate system. The affine transformation can be determined based on restrictions that a left eye center is moved to point ($\frac{1}{3}$, $\frac{1}{3}$), a right eye center is moved to point ($\frac{2}{3}$, $\frac{1}{2}$), and a mouth center is moved to the point ($\frac{1}{2}$, $\frac{2}{3}$).

Figure 9:
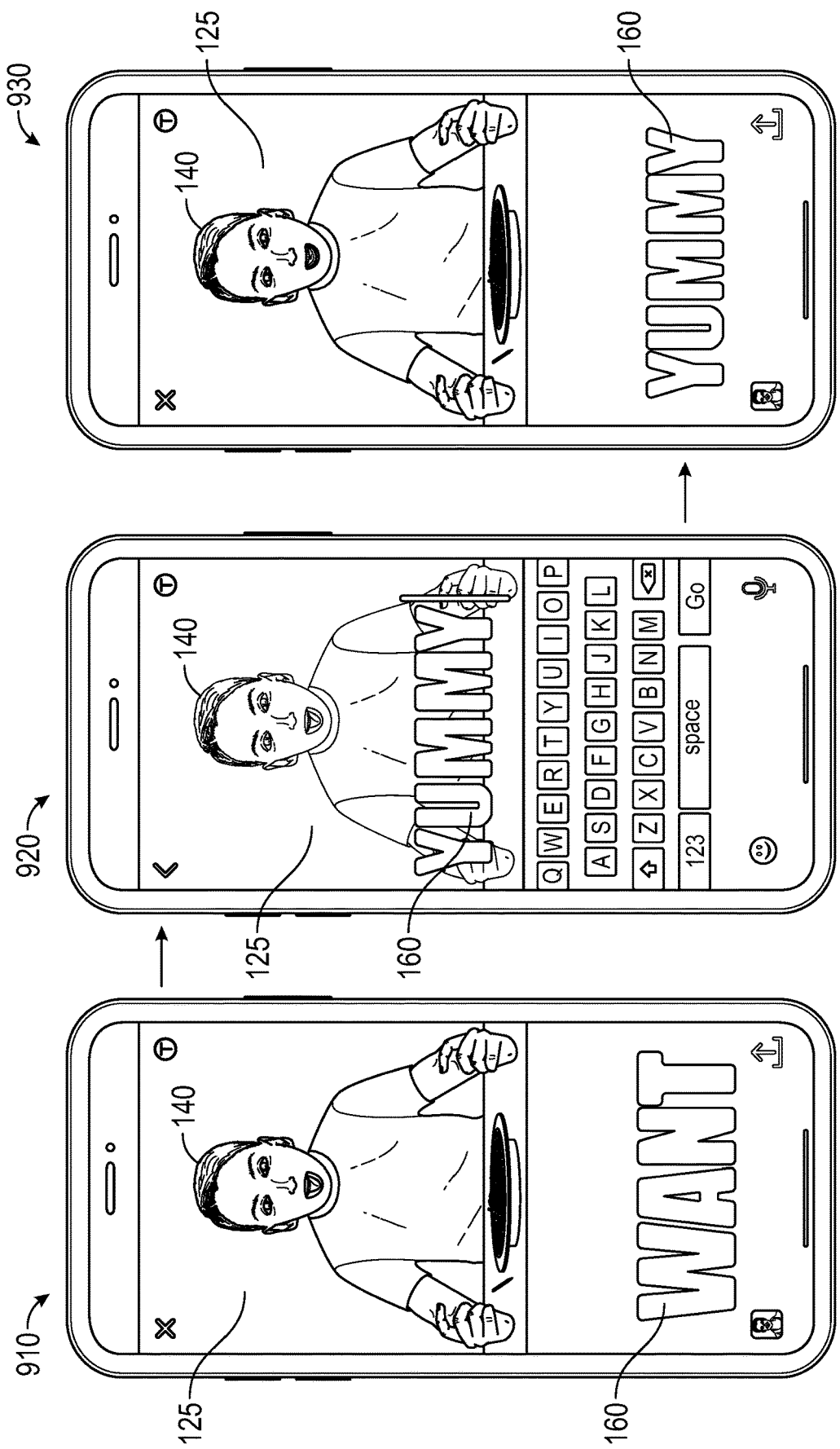
FIG. 9 shows screenshots of an example mobile application for text and audio-based real-time face reenactment, according to an example embodiment.

FIG. 9 shows screenshots 910, 920, and 930 of an example mobile application for a computing device 110, according to an example embodiment. The mobile application may include the face reenactment system 220.

As shown in screenshot 910, the mobile application may display a target image 125 with a target face 140 to be animated and an input text 160. The mobile application may generate, using the face reenactment system 220, audio data (sound waveform) for the input text 160 and a video animating the target face 140 in the target image 125.

As shown in screenshot 920, the mobile application may include a user interface to modify the input text 160 using a keyboard input. In further embodiments, the mobile application may allow changing text style, font, size, position, and color, selection of text appearance time and animation, visual effects, and an audio filter. The audio filter can be based on a preset style. The mobile application may start generating, based on the modified input text, a sequence of sets of scenario data and playing the animated target image 125 when user taps a "Done" button.

As shown in screenshot 930, original input text 160 is replaced by the text modified by the user. A vocoder may generate an audio data to match the input text 160. The face reenactment system 220 may generate an animation of the target face 140 to match the audio data. In further embodiments, the mobile device may allow to enter an input text and/or audio via an audio or video recording.

Figure 10:
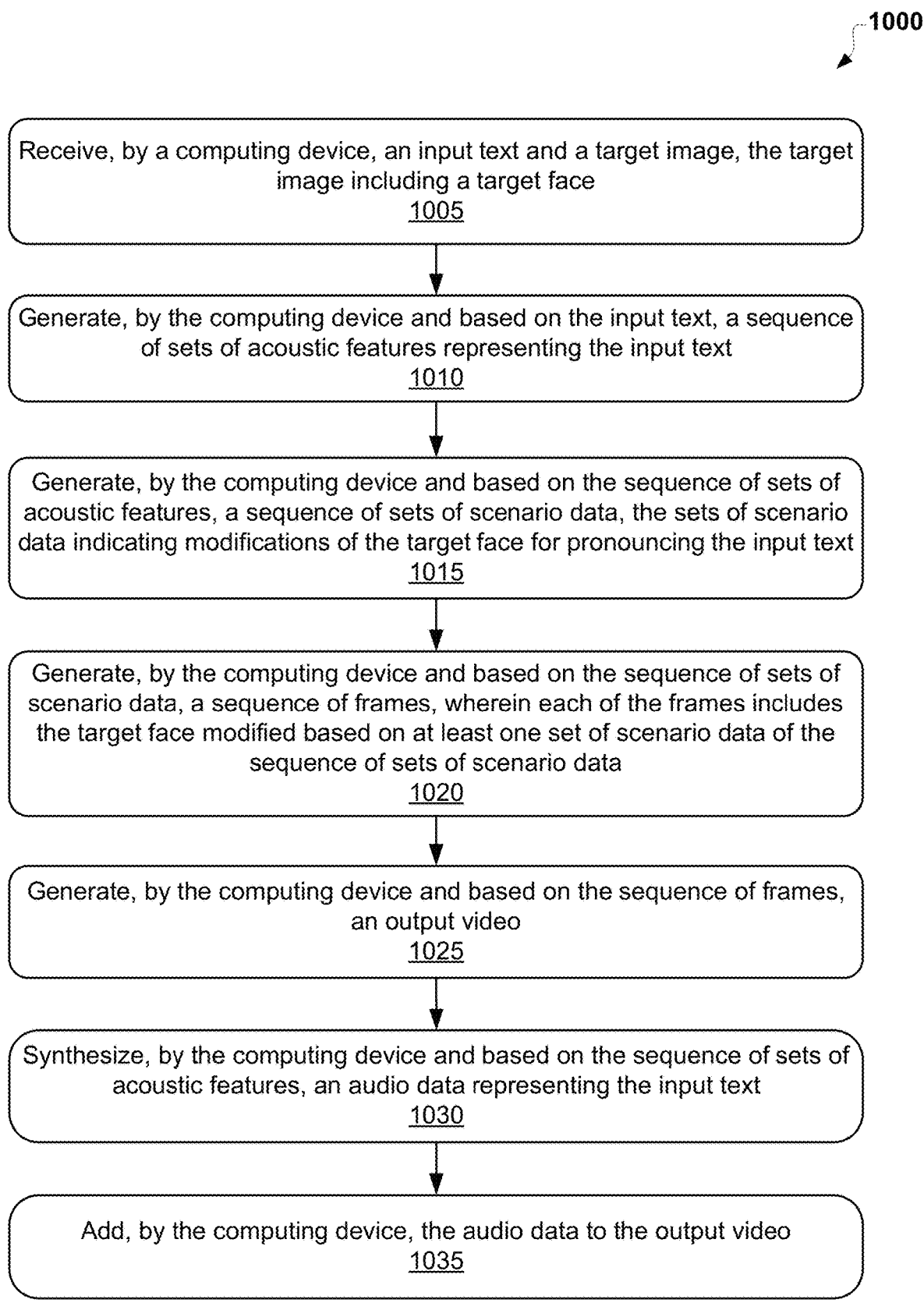
FIG. 10 is a flow chart showing a method for text and audio-based real-time face reenactment, in accordance with some example embodiments.

FIG. 10 is a flow chart showing a method 1000 for text and audio-based real-time face reenactment, according to some example embodiments. The method 1000 can be performed by computing device 110 and the face reenactment system 220.

The method 1000 may commence, in block 1005, with receiving, by the computing device, an input text and a target image. The target image may include a target face.

In block 1010, the method 1000 may include generating, by the computing device and based on the input text, a sequence of sets of acoustic features representing the input text.

In block 1015, the method 1000 may include generating, by the computing device and based on the sequence of sets of acoustic features, a sequence of sets of scenario data. The sets of scenario data may indicate modifications of the target face for pronouncing the input text.

In block 1020, the method 1000 may include generating, by the computing device and based on the sequence of sets of scenario data, a sequence of frames. Each of the frames may include the target face modified based on at least one set of scenario data of the sequence of sets of scenario data.

In block 1025, the method 1000 may include generating, by the computing device and based on the sequence of frames, an output video.

In block 1030, the method 1000 may include synthesizing, by the computing device and based on the sequence of sets of acoustic features, an audio data representing the input text.

In block 1035, the method 1000 may include adding, by the computing device, the audio data to the output video.

Figure 11:
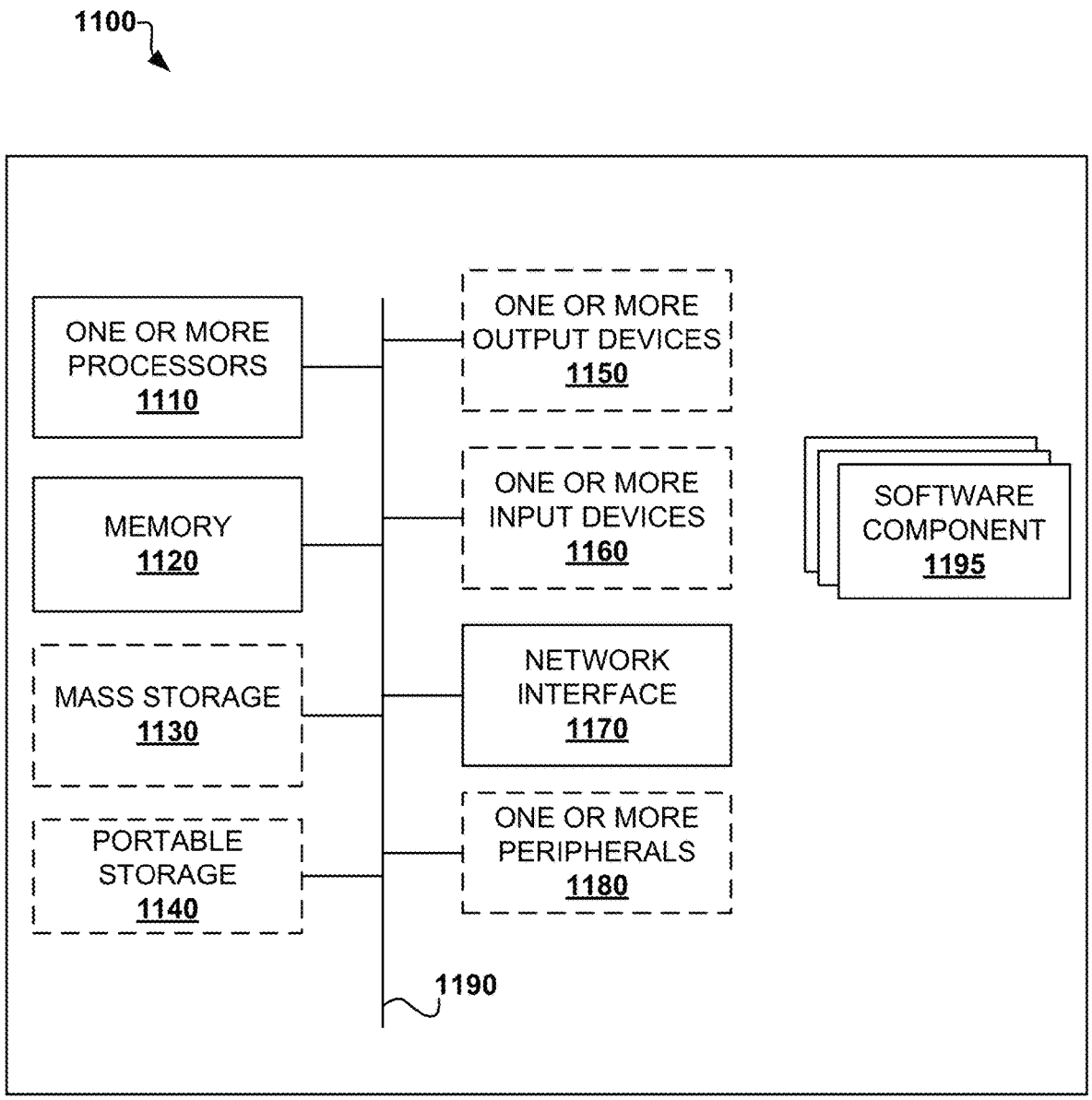
FIG. 11 shows an example computer system that can be used to implement the methods for text and audio-based real-time face reenactment.

FIG. 11 illustrates an example computing system 1100 that may be used to implement methods described herein. The computing system 1100 may be implemented in the contexts of the likes of the computing device 110, the face reenactment system 220, the 3D face model 505, the sparse correspondence module 510, the scenario data generation module 515, the target image preprocessing module 520, and the image animation and refinement module 530.

As shown in FIG. 11, the hardware components of the computing system 1100 may include one or more processors 1110 and memory 1120. Memory 1120 stores, in part, instructions and data for execution by processor 1110. Memory 1120 can store the executable code when the system 1100 is in operation. The system 1100 may further include an optional mass storage device 1130, optional portable storage medium drive(s) 1140, one or more optional output devices 1150, one or more optional input devices 1160, an optional network interface 1170, and one or more optional peripheral devices 1180. The computing system 1100 can also include one or more software components 1195 (e.g., ones that can implement the method for portrait animation as described herein).

The components shown in FIG. 11 are depicted as being connected via a single bus 1190. The components may be connected through one or more data transport means or a data network. The processor 1110 and memory 1120 may be connected via a local microprocessor bus, and the mass storage device 1130, peripheral device(s) 1180, portable storage device 1140, and network interface 1170 may be connected via one or more input/output (I/O) buses.

The mass storage device 1130, which may be implemented with a magnetic disk drive, solid-state disk drive, or an optical disk drive, is a non-volatile storage device for storing data and instructions for use by the processor 1110. Mass storage device 1130 can store the system software (e.g., software components 1195) for implementing embodiments described herein.

Portable storage medium drive(s) 1140 operates in conjunction with a portable non-volatile storage medium, such as a compact disk (CD) or digital video disc (DVD), to input and output data and code to and from the computing system 1100. The system software (e.g., software components 1195) for implementing embodiments described herein may be stored on such a portable medium and input to the computing system 1100 via the portable storage medium drive(s) 1140.

The optional input devices 1160 provide a portion of a user interface. The input devices 1160 may include an alphanumeric keypad, such as a keyboard, for inputting alphanumeric and other information, or a pointing device, such as a mouse, a trackball, a stylus, or cursor direction keys. The input devices 1160 can also include a camera or scanner. Additionally, the system 1100 as shown in FIG. 11 includes optional output devices 1150. Suitable output devices include speakers, printers, network interfaces, and monitors.

The network interface 1170 can be utilized to communicate with external devices, external computing devices, servers, and networked systems via one or more communications networks such as one or more wired, wireless, or optical networks including, for example, the Internet, intranet, LAN, WAN, cellular phone networks, Bluetooth radio, and an IEEE 802.11-based radio frequency network, among others. The network interface 1170 may be a network interface card, such as an Ethernet card, optical transceiver, radio frequency transceiver, or any other type of device that can send and receive information. The optional peripherals 1180 may include any type of computer support device to add additional functionality to the computer system.

The components contained in the computing system 1100 are intended to represent a broad category of computer components. Thus, the computing system 1100 can be a server, personal computer, hand-held computing device, telephone, mobile computing device, workstation, minicomputer, mainframe computer, network node, or any other computing device. The computing system 1100 can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium or processor-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a processor for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-read-only memory (ROM) disk, DVD, any other optical medium, any other physical medium with patterns of marks or holes, a RAM, a PROM, an EPROM, an EEPROM, any other memory chip or cartridge, a carrier wave, or any other medium from which a computer can read.

Various forms of computer-readable media may be involved in carrying one or more sequences of one or more instructions to a processor for execution. A bus carries the data to system RAM, from which a processor retrieves and executes the instructions. The instructions received by the system processor can optionally be stored on a fixed disk either before or after execution by a processor.

Thus, the methods and systems for text and audio-based real-time face reenactment have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for text and audio-based real-time face reenactment, the method comprising:
receiving, by a computing device, an input text and a target image, the target image including a target face;
generating, by the computing device and based on the input text, a sequence of sets of acoustic features representing the input text;
generating, by the computing device and based on the sequence of sets of acoustic features, a sequence of sets of scenario data, the sets of scenario data indicating modifications of facial key points of a model face pronouncing the input text, wherein the generating the sequence of sets of scenario data includes:
generating, based on the sequence of sets of acoustic features, a sequence of sets of mouth key points of the model face by providing the sets of acoustic features to a first model, the first model being trained to generate, based on a set of acoustic features, a set of mouth key points, the first model being trained based on first images of a first actor pronouncing first training input texts; and
generating, based on the sequence of sets of mouth key points, a sequence of sets of the facial key points of the model face by providing the sets of mouth key points to a second model, the second model being trained to generate, based on the set of mouth key points, a set of the facial key points, the second model being trained based on second images of a second actor pronouncing second training input texts;
generating, by the computing device and based on the sequence of sets of scenario data and the target image, a sequence of frames, wherein each of the frames includes the target face modified based on at least one set of scenario data of the sequence of sets of scenario data; and
generating, by the computing device and based on the sequence of frames, an output video.

2. The method of claim 1, further comprising:
synthesizing, by the computing device and based on the sequence of sets of acoustic features, an audio data representing the input text; and
adding, by the computing device, the audio data to the output video.

3. The method of claim 1, wherein the acoustic features include Mel- frequency cepstral coefficients.

4. The method of claim 1, wherein the sequence of sets of acoustic features is generated by a neural network.

5. The method of claim 1, wherein:
the generating the sequence of frames includes:
determining, based on a sequence of sets of the facial key points, a sequence of sets of two-dimensional (2D) deformations; and
applying each set of 2D deformations of the sequence of the sets of 2D deformations to the target image to obtain the sequence of frames.

6. The method of claim 5, wherein:
the sequence of sets of mouth key points is generated by a neural network; and
at least one set of the sequence of sets of mouth key points is generated based on a pre-determined number of sets preceding the at least one set in the sequence of sets of mouth key points.

7. The method of claim 6, wherein:
the at the least one set of the sequence of sets of mouth key points corresponds to at least one set (S) of the sequence of sets of acoustic features; and
the at least one set of the sequence of sets of mouth key points is generated based on a first pre-determined number of sets of acoustic features preceding the S in the sequence of sets of acoustic features and a second pre-determined number sets of acoustic features succeeding the S in the sequence of sets of acoustic features.

8. The method of claim 5, wherein:
the sequence of sets of facial key points is generated by a neural network; and
at least one set of the sequence of sets of facial key points is determined based on a pre-determined number of sets preceding the at least one set in the sequence of sets of facial key points.

9. The method of claim 5, further comprising:
generating, by the computing device and based on the sequence of sets of mouth key points, a sequence of mouth texture images; and
inserting, by the computing device, each of the sequence of mouth texture images in a corresponding frame of the sequence of the frames.

10. The method of claim 9, wherein each mouth texture image of the sequence of mouth texture images is generated by a neural network based on a first pre-determined number of mouth texture images preceding the mouth region image in the sequence of mouth region images.

11. A system for text and audio-based real-time face reenactment, the system comprising at least one processor, a memory storing processor-executable codes, wherein the at least one processor is configured to implement the following operations upon executing the processor-executable codes:
receiving an input text and a target image, the target image including a target face;
generating, based on the input text, a sequence of sets of acoustic features representing the input text;
generating, based on the sequence of sets of acoustic features, a sequence of sets of scenario data, the sets of scenario data indicating modifications of facial key points of a model face pronouncing the input text, wherein the
generating the sequence of sets of scenario data includes:
generating, based on the sequence of sets of acoustic features, a sequence of sets of mouth key points of the model face by providing the sets of acoustic features to a first model, the first model being trained to generate, based on a set of acoustic features, a set of mouth key points, the first model being trained based on first images of a first actor pronouncing first training input texts; and
generating, based on the sequence of sets of mouth key points, a sequence of sets of the facial key points of the model face by providing the sets of mouth key points to a second model, the second model being trained to generate, based on the set of mouth key points, a set of the facial key points, the second model being trained based on second images of a second actor pronouncing second training input texts;

generating, based on the sequence of sets of scenario data and the target image, a sequence of frames, wherein each of the frames includes the target face modified based on at least one set of scenario data of the sequence of sets of scenario data; and generating, based on the sequence of frames, an output video.

12. The system of claim 11, further comprising:

synthesizing, based on the sequence of sets of acoustic features, an audio data representing the input text; and adding the audio data to the output video.

13. The system of claim 11, wherein the acoustic features include Mel-frequency cepstral coefficients.

14. The system of claim 11, wherein the sequence of sets of acoustic features is generated based on a neural network.

15. The system of claim 11, wherein:

the generating the sequence of frames includes:

determining, based on a sequence of sets of the facial key points, a sequence of sets of 2D deformations; and applying each set of two-dimensional (2D) deformations of the sequence of the sets of 2D deformations to the target image to obtain the sequence of frames.

16. The system of claim 15, wherein:

the sequence of sets of mouth key points is generated by a neural network; and at least one set of the sequence of sets of mouth key points is generated based on a pre-determined number of sets preceding the at least one set in the sequence of sets of mouth key points.

17. The system of claim 16, wherein:

the at the least one set of the sequence of sets of mouth key points corresponds to at least one set (S) of the sequence of sets of acoustic features; and the at least one set of the sequence of sets of mouth key points is generated based on a first pre-determined number of sets of acoustic features preceding the S in the sequence of sets of acoustic features and a second pre-determined number sets of acoustic features succeeding the S in the sequence of sets of acoustic features.

18. The system of claim 15, wherein:

the sequence of sets of facial key points is generated by a neural network; and at least one set of the sequence of sets of facial key points is generated based on a pre-determined number of sets preceding the at least one set in the sequence of sets of facial key points.

19. The system of claim 15, further comprising:

generating, by the computing device and based on the sequence of sets of mouth key points, a sequence of mouth texture images; and inserting, by the computing device, each of the sequence of mouth texture images in a corresponding frame of the sequence of the frames.

20. A non-transitory processor-readable medium having instructions stored thereon, which when executed by one or more processors, cause the one or more processors to implement a method for text and audio- based real-time face reenactment, the method comprising:

receiving an input text and a target image, the target image including a target face;

generating, based on the input text, a sequence of sets of acoustic features representing the input text;

generating, based on the sequence of sets of acoustic features, a sequence of sets of scenario data, the sets of scenario data indicating modifications of facial key points of a model face pronouncing the input text, wherein the generating the sequence of sets of scenario data includes:

generating, based on the sequence of sets of acoustic features, a sequence of sets of mouth key points of the model face by providing the sets of acoustic features to a first model, the first model being trained to generate, based on a set of acoustic features, a set of mouth key points, the first model being trained based on first images of a first actor pronouncing first training input texts; and generating, based on the sequence of sets of mouth key points, a sequence of sets of the facial key points of the model face by providing the sets of mouth key points to a second model, the second model being trained to generate, based on the set of mouth key points, a set of the facial key points, the second model being trained based on second images of a second actor pronouncing second training input texts;

generating, based on the sequence of sets of scenario data and the target image, a sequence of frames, wherein each of the frames includes the target face modified based on at least one set of scenario data of the sequence of sets of scenario data; and generating, based on the sequence of frames, an output video.

* * * * *